United States Patent [19]

Kajitani et al.

[11] Patent Number: 4,841,132
[45] Date of Patent: Jun. 20, 1989

[54] PROGRAM RECORDING SCHEDULING APPARATUS USING AN OPTICAL READER

[75] Inventors: Masahiko Kajitani, Neyagawa; Kiyoshi Takeda, Katano; Koji Isono, Neyagawa; Masumi Hirose, Kyoto; Kouji Matsubara, Moriguchi; Etsuji Shuda, Osaka, all of Japan

[73] Assignee: Matsushita Electric Industrial Co., Ltd., Japan

[21] Appl. No.: 74,552

[22] Filed: Jul. 16, 1987

[30] Foreign Application Priority Data

| Jul. 21, 1986 | [JP] | Japan | 61-171266 |
| Aug. 19, 1986 | [JP] | Japan | 61-194457 |
| Aug. 19, 1986 | [JP] | Japan | 61-194458 |
| Aug. 22, 1986 | [JP] | Japan | 61-197521 |
| Aug. 26, 1986 | [JP] | Japan | 61-199643 |

[51] Int. Cl.⁴ .......................... G06K 7/10; G06F 3/06
[52] U.S. Cl. .................................. 235/472; 235/375; 358/335
[58] Field of Search ............... 358/335; 235/375, 419, 235/454, 462, 472, 383, 385, 386; 364/400, 401

[56] References Cited

U.S. PATENT DOCUMENTS

| 4,222,069 | 9/1980 | Groetschel | 358/335 |
| 4,415,065 | 11/1983 | Sandstedt | 235/383 |
| 4,465,926 | 8/1984 | Apitz et al. | 235/454 |
| 4,471,218 | 9/1984 | Culp | 235/472 |
| 4,475,153 | 10/1984 | Kihara et al. | 358/335 |
| 4,521,678 | 6/1985 | Winter | 235/462 |
| 4,621,259 | 11/1986 | Schepers et al. | 358/335 |
| 4,641,205 | 2/1987 | Beyers | 358/335 |

FOREIGN PATENT DOCUMENTS 56-168281 12/1981 Japan.

Primary Examiner—Alan Faber
Assistant Examiner—Robert A. Weinhardt
Attorney, Agent, or Firm—Stevens, Davis, Miller & Mosher

[57] ABSTRACT

The desired program information are read by an optical bar code reading section from a program medium containing program information for automatic broadcast program recording, such as, channels, dates, start times and end times in bar code form. After the program information thus read have been temporarily stored in a program memory section, a transfer switch is operated so that the program information stored in the program memory section are converted to infrared remote control signals and are then transmitted in a wireless manner to an electronic equipment (e.g., a video tape recorder) to be controlled, thereby recording the program for the recording of the desired broadcast program.

11 Claims, 9 Drawing Sheets

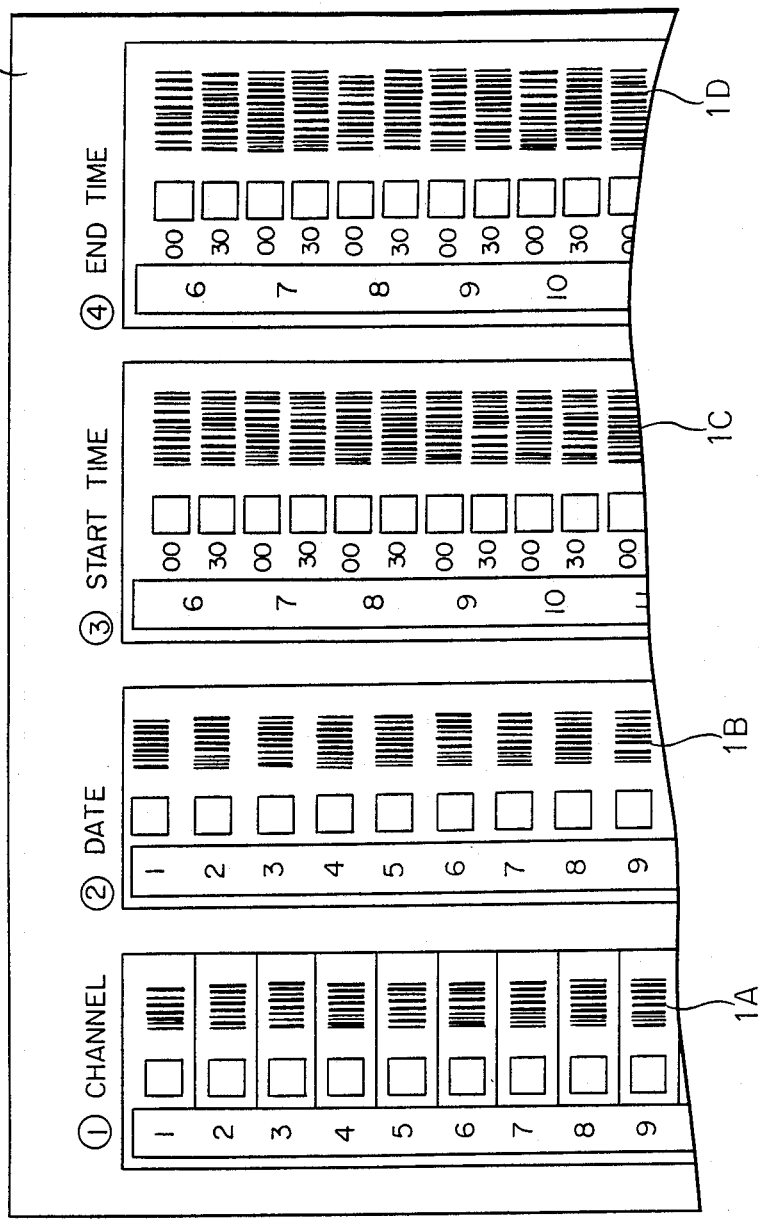

FIG. 5
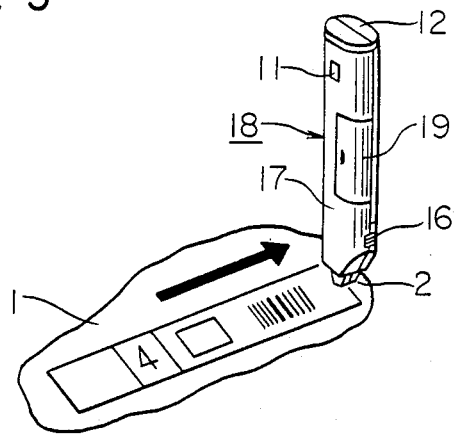
FIG. 6
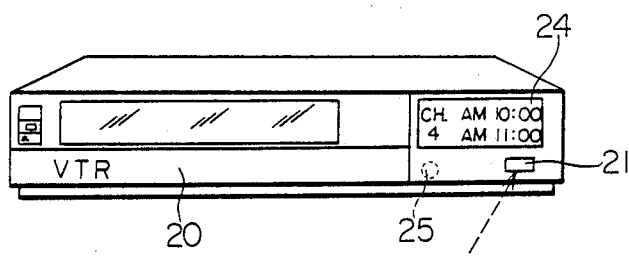
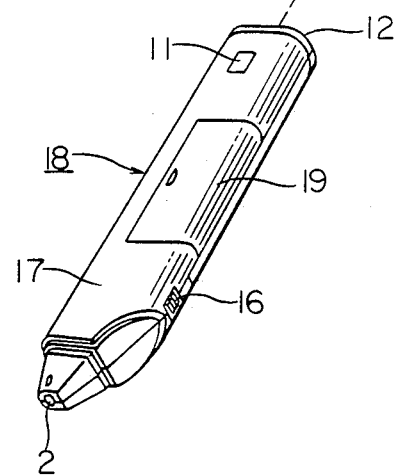

PROGRAM RECORDING SCHEDULING APPARATUS USING AN OPTICAL READER

BACKGROUND OF THE INVENTION

The present invention relates to video tape recorders (hereinafter referred to as VTR's) of the type having, for example, a timer program recording function whereby a power source is automatically turned on to record a given television broadcast program when a preset time is reached and the recording is ended after the expiration of a preset time interval to turn off the power source, and more particularly the invention relates to a program recording apparatus for electronic equipment designed so that the desired program contents for program recording purposes are read from a program medium (e.g., a printed sheet) containing television broadcast station channels, dates, start times for recording, end times, etc., in the form of bar codes and are inputted to a VTR proper for the purpose of timer program recording.

Referring to FIG. 1, a description will be made of a conventional apparatus designed to effect the desired program recording for a VTR by reading the desired program contents in bar code form by a bar code reader.

In the FIG., numeral 101 designates a VTR capable of timer programming the desired channel for recording, date, start time for recording and end time, 102 a television receiver connected to the VTR 101, and 103A, 103B, 103C and 103D program media for program recording purposes which respectively contain the desired channels for recording, dates, start times for recording and end times of recording printed in the form of bar codes (these program media are hereinafter collectively referred to as a printed sheet 103).

Numeral 104 designates an optical bar code reader for reading the bar codes of a desired program from the printed sheet 103 and inputting the same to the VTR 101 through a cord 105 for timer program recording purposes.

However, this conventional apparatus is disadvantageous in that since the data read by the bar code reader 104 must be transmitted to the VTR 101 through the code 105, the user is allowed to use the apparatus within the reach of the cord 105 only and at the same time there are inconveniences in use such that the cord 105 becomes a hindrance when scanning the program sheet 103 by the bar code reader 104.

SUMMARY OF THE INVENTION

With a view to overcoming the foregoing deficiencies in the prior art, it is an object of the present invention to provide a program recording apparatus for electronic equipment so designed that after the desired program contents in bar code form have been read, a switch is simply turned on aiming at a VTR proper to apply the necessary inputs for timer program recording purposes to the VTR proper in a wireless manner, thus making the apparatus simple in operation and handling.

It is another object of the invention to provide a program recording apparatus for electronic equipment so designed that after a plurality of bar code information have been read successively, the thus read program information are transmitted collectively to an electronic equipment to be controlled, thereby simplifying the transmitting operation.

It is still another object of the invention to provide a program recording apparatus for electronic equipment so designed that even if any wrong bar code has been scanned and read, the proper bar code can be scanned immediately thereafter to correct the error, thereby simplifying the correction procedure.

The above and other objects and features of the invention will appear in the following description and appended claims, reference being made to the accompanying drawings forming a part of this specification wherein like reference characters designate corresponding parts in the several views.

BRIEF DESCRIPTION OF THE DRAWINGS

FIG. 4 is a plan view showing by way of example the principal parts of a program medium used with the invention.

FIG. 5 is an exterior view showing, along with a part of the program medium, the embodiment of the program recording apparatus for electronic equipment according to the invention.

FIG. 6 is an exterior view showing an exemplary manner in which the embodiment of the invention is used.

DESCRIPTION OF THE PREFERRED EMBODIMENT

Figure 1:
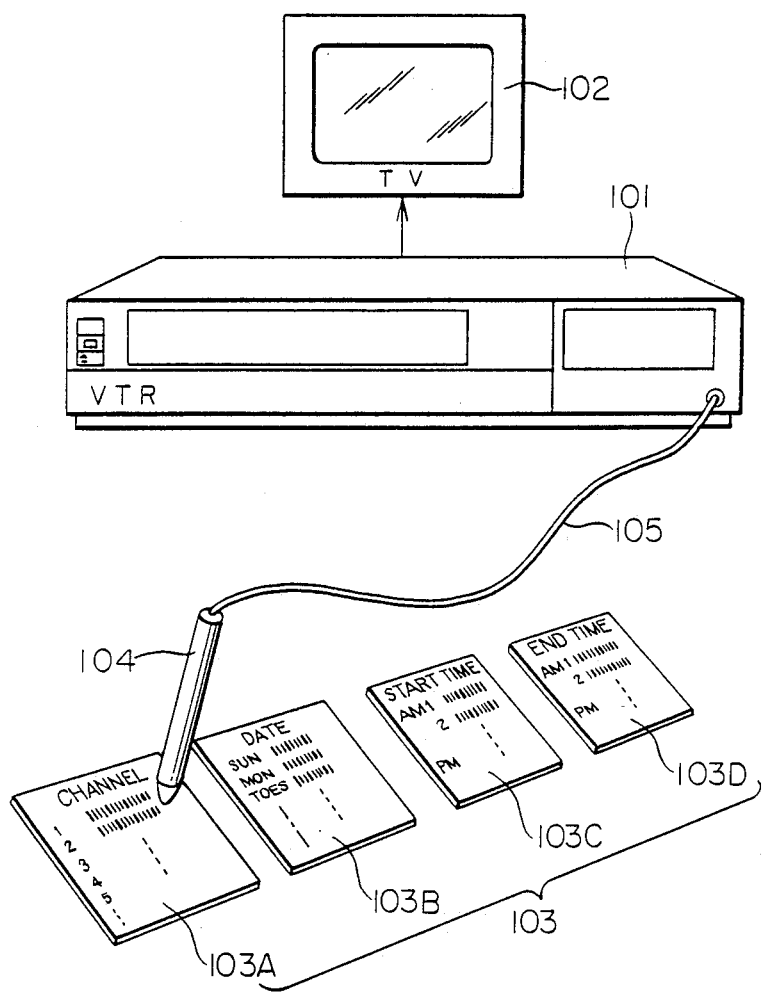
FIG. 1 is a perspective view showing an example of a conventional program recording apparatus for electronic equipment.
Figure 2:
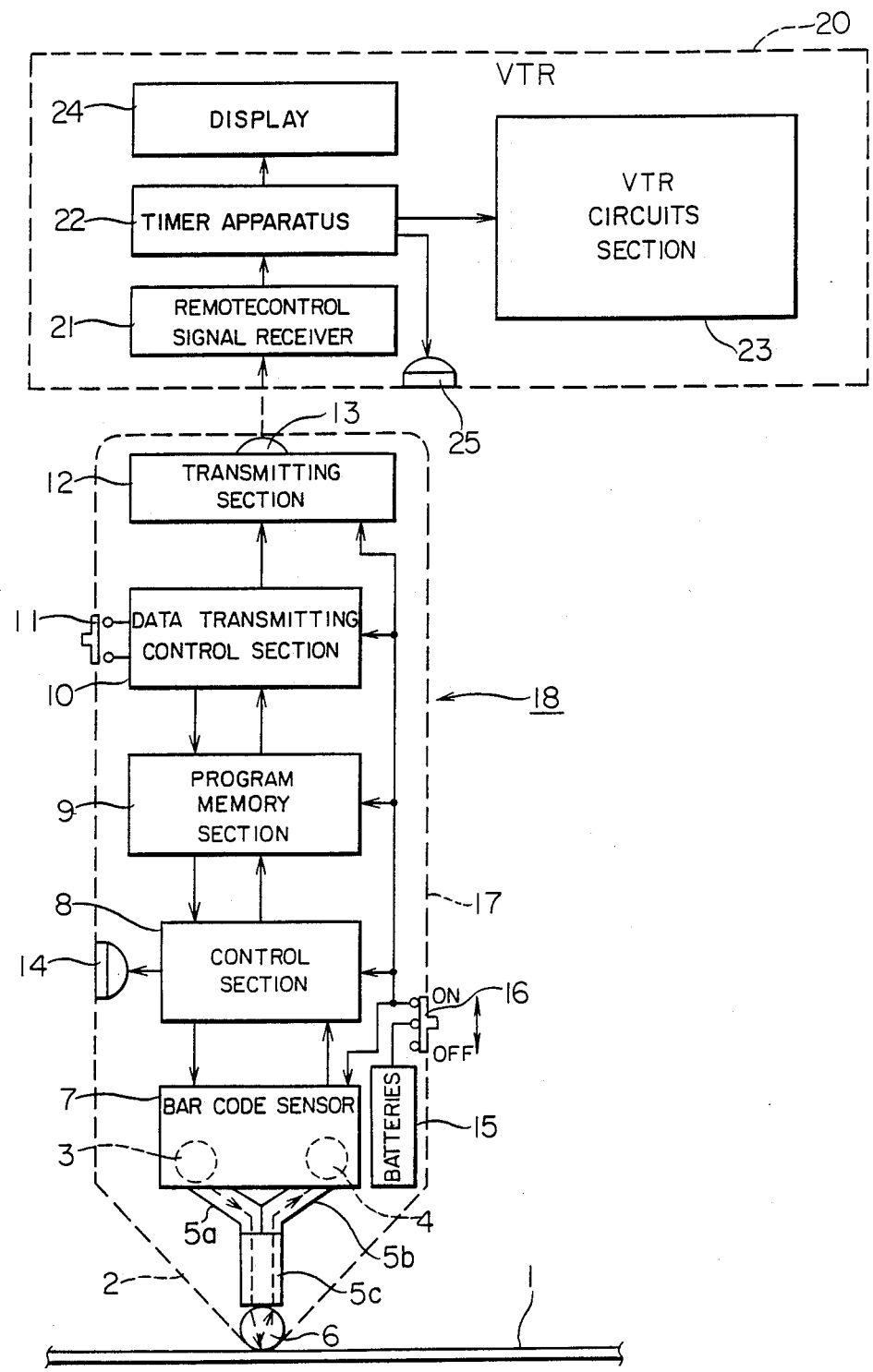
FIG. 2 is a block diagram showing the principal parts of an embodiment of a program recording apparatus for electronic equipment according to the invention.

Referring to FIG. 2 illustrating an overall block diagram for an embodiment of the invention, a VTR is shown as an electronic equipment to be controlled by way of example. In the Figure, numeral 1 designates a program medium in the form of a printed sheet or book containing program information indicative of television broadcasting station channels, dates, starting times for recording and end times in bar code form. It is hereinafter referred to as a program sheet. Numeral 2 designates a bar code reading section comprising mainly a bar code sensor 7 including a light emitting device 3, e.g., red light-emitting diode, a photosensitive device 4, e.g., photodiode, optical fibers 5a, 5b and 5c and an optical lens 6, and the bar code reading section 2 may include a decoder circuit for converting a bar code information read to an information signal and an amplifier for amplifying the signal.

Numeral 8 designates a control section for controlling the supply of power to the light emitting device 3 and for transmitting the output signals of the bar code sensor 7 hence the information signals from the bar code reading section 2 to a program memory section 9. Numeral 10 designates a data transmitting control section for turning a transfer switch 11 on to collectively transfer the information signals stored in the program memory section 9 to a transmitting section 12.

The transmitting section 12 transmits the information signals from the program memory section 9 as infrared remote control signals through a transmitting device 13 comprising an infrared light-emitting diode or the like.

Numeral 14 designates a sounding device employing a piezoelectric element or the like so that a single-note confirming audible sound of "P" is produced each time the proper reading of a bar code is effected and a confirming audible sound of "P-P-P-P-P--" is produced upon the completion of the intended final reading. Numeral 15 designates batteries serving as a power source, and 16 a power supply switch.

These circuits and components 2 to 16 are mounted in a pen-type case 17 which can be held in one hand, thereby forming a bar code scanner (or bar code reader) 18 constituting one form of the program recording apparatus for electronic equipment according to the invention. In this case, the bar code reading section 2 is arranged at one end (or the forward end) of the case 17 and the transmitting section 12 including the transmitting device 13 is arranged at the other end (or the rear end) of the case 17.

Also in FIG. 2, numeral 20 designates a VTR or electronic equipment to be controlled and it has a function of performing the timer programmed recording of television broadcast programs. Numeral 21 designates a remote control signal receiver for receiving the infrared remote control signals (program information) transmitted from the transmitting section 12 including the transmitting device 13 in the bar code scanner 18 and converting the signals to given electric signals.

Numeral 22 designate a timer apparatus responsive to the output of the remote control signal receiver 21 to apply to a VTR circuits section 23 a recording start command, recording end command, etc., when the corresponding preset (programmed) times are reached and it includes a timer and a comparison circuit. Numeral 24 designates a display including fluorescent display tubes or liquid crystal readouts to display the desired television broadcasting channel, start date or time for recording and end date or time of reacording for program recording purposes in accordance with the output of the remote control signal receiver 21.

It is to be noted that a timer program recording section including the remote control signal receiver 21, the timer apparatus 22 and the display 24 is always supplied with power even if the main power supply switch of the VTR 20 is not on and it is constructed so that it immediately comes into operation when given input information are applied to the remote control signal receiver 21.

Figure 3A:
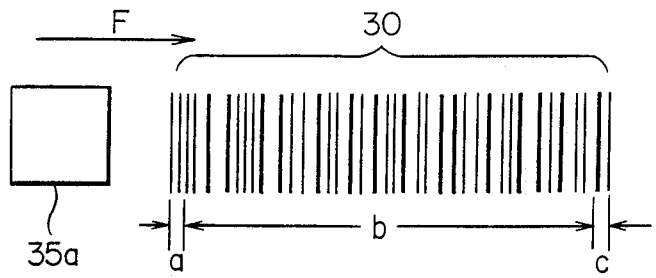
FIGS. 3A to 3E are pattern diagrams showing examples of the bar codes used with the invention.
Figure 3B:
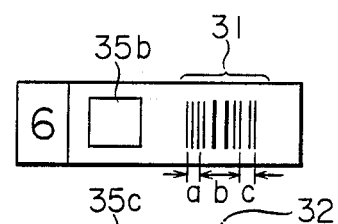
Figure 3C:
Figure 3D:
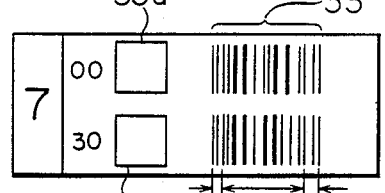
Figure 3E:
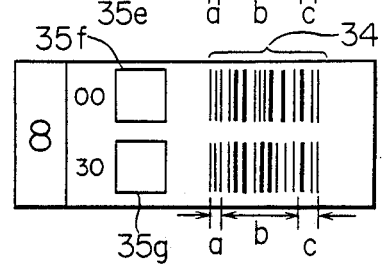

FIG. 3A to FIG. 3E illustrate pattern diagrams showing examples of the bar codes on the program sheet 1 used with the invention, with a showing a start bit code, b a data bit code and c a stop bit code. FIG. 3A shows an example of a bar code collectively representing a plurality of program information, e.g., a channel position, broadcasting date, start time and end time, and FIG. 3B to FIG. 3E show examples of split-type bar codes representing individual program information. More specifically, a bar code 31 of FIG. 3B indicates the channel, a bar code 32 of FIG. 3C the date, a bar code 33 of FIG. 3D the start time for recording and a bar code 34 of FIG. 3E the end time of recording. It is to be noted that in FIG. 3A to FIG. 3E square marks 35a to 35g added to the left of the bar codes are start marks each indicating a position at which the bar code scanner 18 is placed prior to scanning such that the scanning of each bar code by the bar code scanner 18 and hence the reading of the bar code is effected accurately.

FIG. 4 shows a partial plan view of the practical program sheet 1 made by printing channels, dates, start times and end times on a synthetic resin plate or sheet material.

FIG. 5 is a perspective view showing the bar code scanner 18 constituting the embodiment of the invention shown in FIG. 2 and a portion of the program sheet 1 shown in FIG. 4. For the purposes of facilitating the understanding, the portion of the program sheet 1 is shown in an exaggerated form as compared with the bar code scanner 18. Note that in FIG. 5 the same reference numerals are used for the same component parts described in connection with FIG. 2. Numeral 19 designates a cover used for removably mounting the batteries 15 (See FIG. 2) inside the case 17 of the bar code scanner 18.

The program recording procedure and operations according to the present invention will now be described.

Firstly, with the power supply switch 16 turned on, one end of the bar code scanner 18 or the bar code reading section 2 is placed, for example, on the start mark 35a in FIG. 3A and in this condition the reading section 2 is moved at the desired speed in the direction of an arrow F so as to scan the bar code 30 from the left end to the right end. In this case, the bar code sensor 7 starts its reading operation upon detection of the start bit code a, successively reads the bar code information of the following data bit code b or the channel, date, start time and end time of a broadcast program and then stops the reading operation in response to the detection of the stop bit code c. In this case, the sounding device 14 produces a confirming audible sound of "P-P-P-P-P---" when the reading is effected properly. These operations are controlled by the control section 8.

Then, the bar code information read by the bar code sensor 7 are successively converted to electrical bar code signals and then stored as information signals in the program memory section 9 through the amplifier and the decoder circuit. After the reading of the bar codes has been completed in the described manner, the other end of the bar code scanner 18 or the transmitting section 12 is aimed at the remote control signal receiver 21 of the VTR 20 as shown in FIG. 6 and the transfer switch 11 is turned on. When this occurs, the sounding device 14 produces a single-note confirming sound of "P" and also the series of information signals stored in the program memory section 9 are sent to the transmitting section 12 in accordance with the commands from the data transmitting control section 10. Then, these information signals are converted to remote control signals, supplied to the light emitting device 13 and transmitted as infrared remote control signals. The remote control signal receiver 21 of the VTR 20 receives the infrared remote control signals including the series of program information, i.e., the channel, date, start time and end time of the broadcast program, converts them to electric signals and supplies them to the following timer apparatus 22 and display 24, thereby displaying the contents of the program information to the user for a given period of time (e.g., 12 seconds). In this case, if the transmission of the data from the bar code scanner 18 to the VTR 20 has been effected properly or correctly, on the VTR 20 side a sounding device 25 produces a continuous confirming audible sound of "P-P-P-P---", whereas if the transmission has been made improperly, the sounding device 25 produces an abnormal audible sound of "P-P, P-P ---" and in this case the transmission of the data must be made anew.

Of course, the timer apparatus 22 is responsive to the program information inputted in the above-mentioned manner so that when the programmed date arrived, it controls the VTR control circuits section 23 in such a manner that the broadcast program of the programmed channel is recorded for the duration of the programmed time.

A description has been made of the case where the channel, date, start time and end time of the desired broadcast program are read by a single scanning operation of the bar code scanner 18 and the program information are inputted to the VTR 20.

Figure 7:
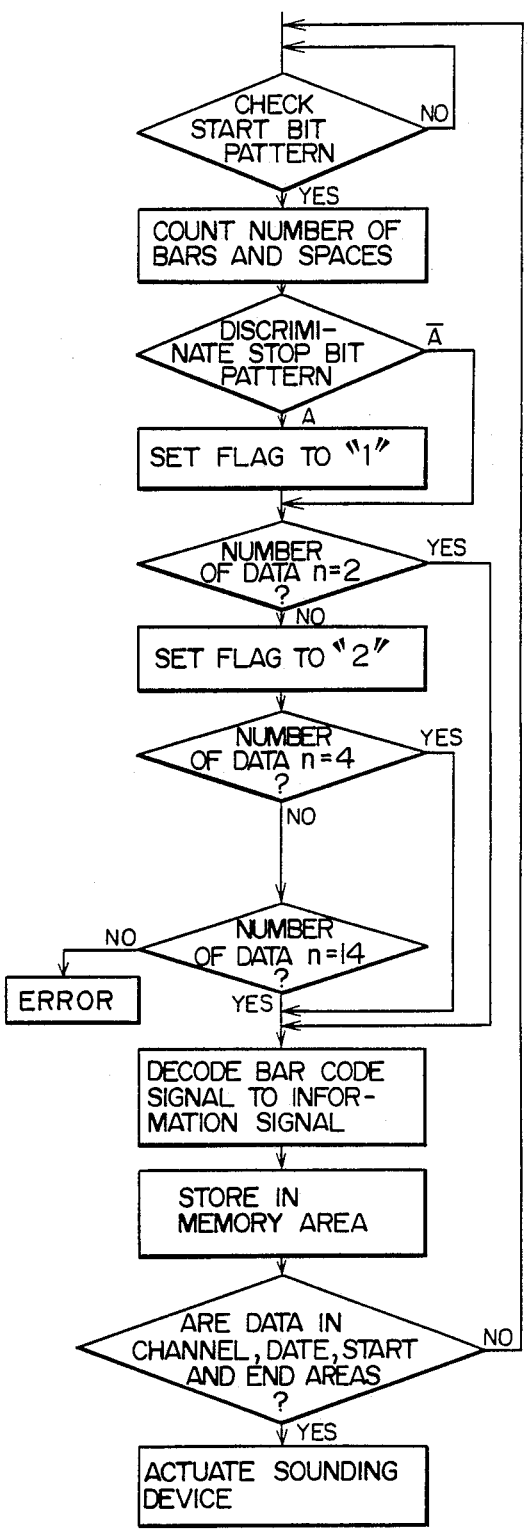
FIG. 7 is a flow chart for explaining an example of the operation of the invention.

Now referring to the flow chart of FIG. 7, a description will be made of a case where the desired channel, date, start time and end time are programmed by using the independent split-type bar codes 31 to 34 shown by way of example in FIG. 3B to FIG. 3E or those shown in FIG. 4. Firstly, a flag is set to "1" if the equality is found with the bar codes 31 and 32 in accordance with the pattern of the stopbit code c in the bar code signal sent from the bar code reading section 2 and the flag is not set to "1" if there is no equality.

Then, if the number of data n is 2, the bar code signal is decoded to a program information signal and stored in the corresponding memory area of the program memory section 9. At this time, the bar code indicates the channel if the flag has been set to "1" and indicates the date if not so, thereby storing the bar code in the corresponding memory area. If the number of data n is not 2, the flag is set to "2" and the number of the data is checked. If the number of data n is 4, the bar code is decoded to a program information signal and stored in the corresponding memory area. At this time, the bar code indicates the start time if the flag has been set to "1" and indicates the end time if not so, thereby storing the bar code in the corresponding memory area. If the number of data n is not 4, the number of the data is checked further so that if the number of data n is 14, the bar code is decoded to a program information signal and stored, thereby storing the data in all of the memory areas for the channel, date, start time and end time. This operation will be described in greater detail later.

When the data have been stored in all of the four memory areas, the sounding device 14 produces a confirming audible sound (end sound) of "P-p-p-p-p---". Otherwise, a single-note sound of "P" indicating the end of reading of the split-bar code is produced and a return is made to the beginning of the flow chart, whereby waiting for the next reading operation.

From the foregoing it will be seen that in accordance with the invention the bar code signals of the channel, date, start time and end time, respectively, are discriminated in code item from one another in accordance with the length of the number of data n and the patterns of the stop bit codes and stored in the corresponding memory areas, thereby making it possible to read either of the block-type bar code 30 and the split-type bar codes 31 to 34. Thus, the program information of a single broadcast program can be set by a single scanning of the bar code scanner 18 and also the program information of a broadcast program of any given channel, date and hour can be set by a suitable combination of the split-type bar codes.

Figure 8:
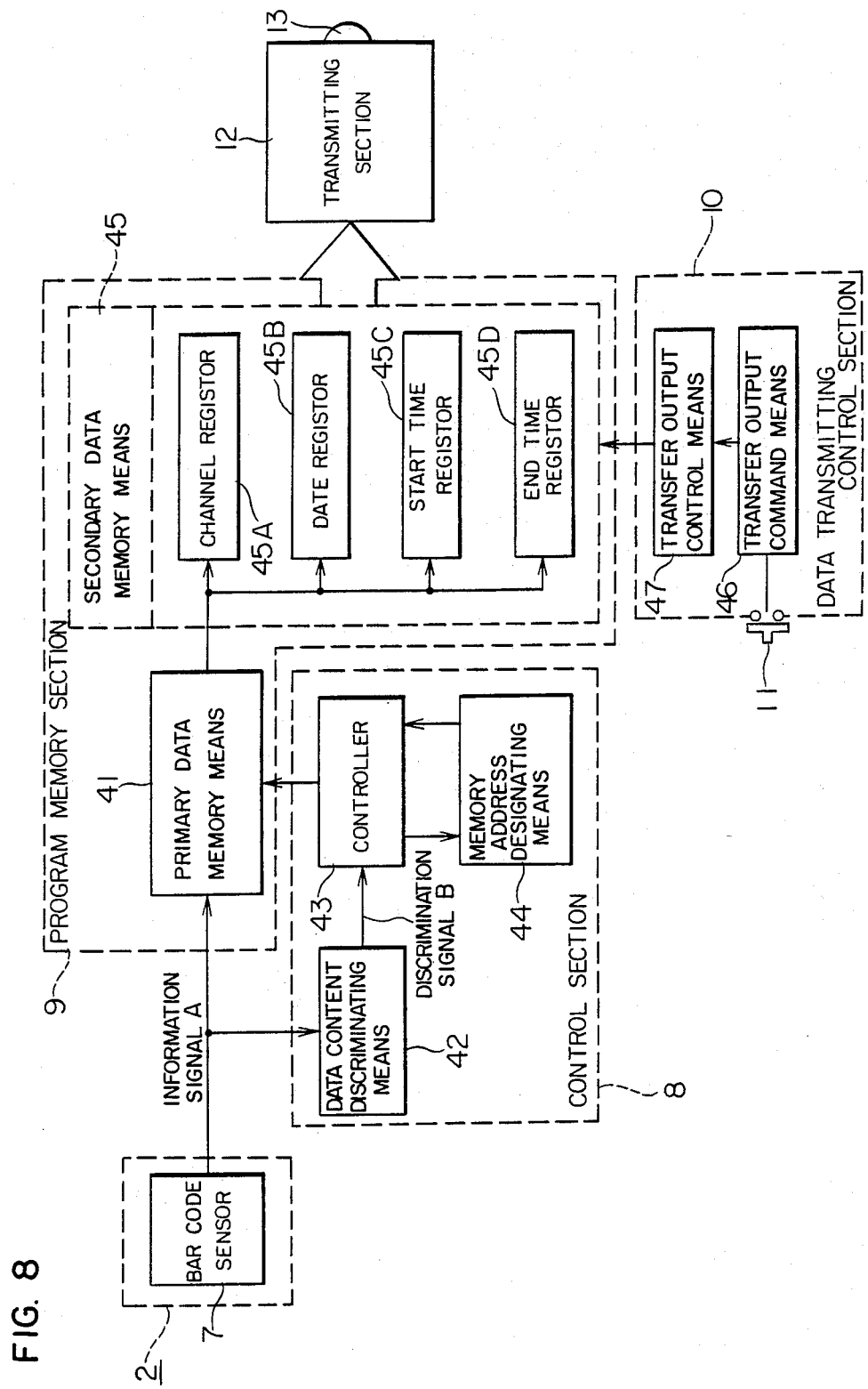
FIGS. 8 and 9 are partial block diagrams for the embodiment of the invention.

The embodiment of the invention has an additional function so that even if a wrong bar code is scanned and read, this is automatically corrected without repeating all over again but immediately scanning the proper bar code. This function will now be described with reference to FIG. 8. When reading a channel indicative bar code 1A printed on the program sheet 1 of FIG. 4 through the operation of the bar code scanner 18, an output signal of the bar code reading section 2 or program information signal A is stored in primary data memory means 41 and it is also applied to data content discriminating means 42. The data content discriminating means 42 determines that the content of the program information of the bar code 1A is of the channel and the resulting discrimination signal B is applied to a controller 43. In order for the determining operation the data content discriminating means 42 includes, for example, four kinds of discrimination tables storing the possible program information and checks the signal A with the information of the tables to detect a coincidence therebetween and thereby output the discrimination signal B. In response to the discrimination signal B, the controller 43 determines through memory address designating means 44 which of registers 45A, 45B, 45C and 45D of secondary data memory means 45 is to be supplied with the signal. In this case, the memory address designating means 44 is provided with a correspondence table for designating the address of the register 45A, 45B, 45C or 45D in correspondence to the content of the program information. The controller 43 designates the address of the register corresponding to the content of the program information so that in this case the address of the channel register 45A is designated in correspondence to the program information stored in the primary data memory means 41. As a result, the signal is delivered to the channel register 45A from the primary data memory means 41, thereby storing the signal in the channel register 45A.

Then, when a date indicative bar code 1B, a start time indicative bar code 1C and an end time indicative bar code 1D, shown in FIG. 4, are successively scanned and read by the bar code scanner 18, these information are respectively stored in the registers 45B, 45C and 45D of the secondary data memory means 45. In the case, the bar codes 1A, 1B, 1C and 1D need not be read successively in this order by the bar code scanner 18 and these bar codes may be read in any different order as occasion demands. The reason is that as will be seen from the foregoing description, the data content discriminating means 42 determines the contents of the program information and the memory address designating means 44 designates the addresses of the registers in accordance with the contents of the program information.

Then, when the transfer switch 11 is turned on, in accordance with the commands from transfer output command means 46 forming a part of the data transmitting control section 10, the signals stored in the secondary data memory means 45 are outputted by transfer output control means 47 to the transmitting section 12 and are transmitted to the VTR 20. Thus, the program information are transmitted to the VTR 20.

In this condition, if the user becomes aware that he has made an erroneous operation in the handling of the date indicative bar code 1B, the bar code 1B indicating the proper date is immediately scanned by the bar code scanner 18 and the resulting signal is inputted to the primary data memory means 41. Then, the data content discriminating means 42 determines that the content of the inputted signal or the program information is the date, so that the controller 43 receives the address of the date register 45B from the memory address designating means 44 and thus the correct date data is inputted to the date register 45B in place of the erroneous data stored therein.

By virtue of this construction, the data content discriminating means 42 determines the content of each program information and in accordance with this information content the program information is stored in the selected memory means. Thus, the program information indicated by each bar code can be easily handled and also any erroneous program information can be easily corrected.

Figure 9:
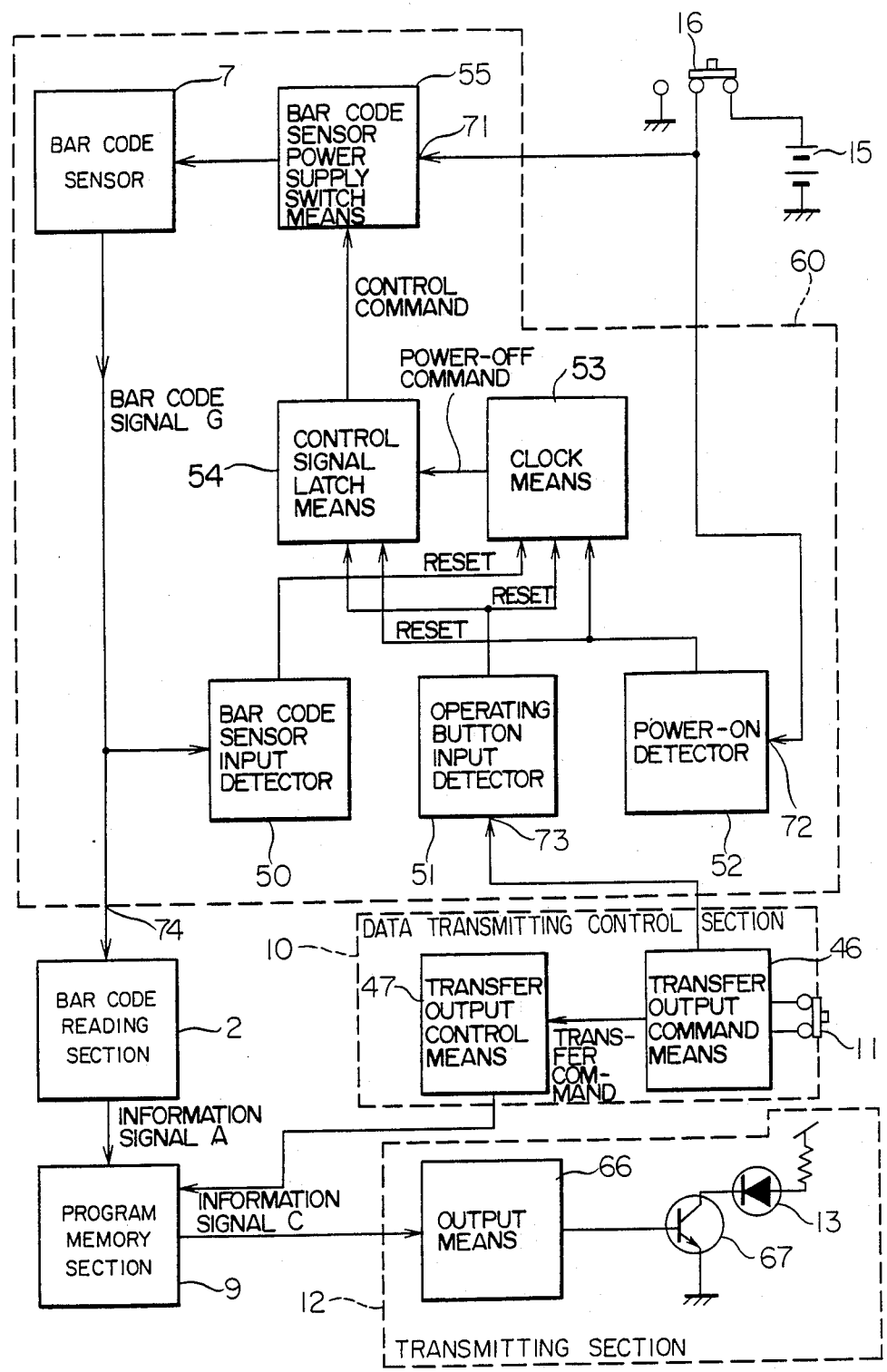

In addition, this embodiment of the invention gives due consideration so that when the bar code scanner 18 is left to stand in a nonuse condition for a given period of time after the power supply switch 16 has been turned on as well as when the transfer switch 11 is turned on to transmit infrared remote control signals to the VTR 20, the power supply to the bar code sensor 7 including the light emitting device 3 consuming a relatively large power is automatically stopped so as to eliminate any wasteful power consumption and prolong the life of the batteries 15. This function will be described with reference to FIGS. 9 and 10. Referring first to FIG. 9, numeral 50 designates a bar code sensor input detector for detecting whether a bar code information has been inputted to the bar code sensor 7 so that when a bar code signal A is outputted, a reset signal is generated. Numeral 51 designates an operating button input detector for detecting whether the transfer switch 11 has been depressed so that a reset signal is generated when the switch 11 is on. Numeral 52 designates a power-on detector for detecting that the power supply switch 16 has been changed from the off to on condition to generate a reset signal. Numeral 53 designates clock means for measuring a predetermined time interval. Numeral 54 designates control signal latch means for storing a control signal for bar code sensor power supply switch means 55 which controls the supply of power to the bar code sensor 7.

The operation of the circuitry of FIG. 9 will now be described.

When the power supply switch 16 is changed from the off to on condition, the power-on detector 52 applies a reset signal to the control signal latch means 54 and the clock means 53 and thus the power is supplied from the batteries 15 to the bar code sensor 7 through the bar code sensor power supply switch means 55. In this case, during the time that the bar code scanner 18 is being used by the user, bar code information is inputted thereby outputting a bar code signal G or the transfer switch 11 is on. This is detected by the bar code sensor input detector 50 or the operating button input detector 51 to reset the clock means 53 and the application of a power-off command to the control signal latch means 54 is prevented. Thus, the user is allowed to use the bar code scanner 18 as long as he desires. At this time, if a predetermined time (e.g., over 25 seconds) expires with the power supply switch 11 of the bar code scanner 18 being left in the on condition by the user, the control signal latch means 54 stores a power-off condition in response to a power-off command from the clock means 53. As a result, the bar code sensor power supply switch means 55 stops the power supply to the bar code sensor 7 and the power consumption of the batteries 15 is reduced. When the bar code scanner 18 is to be used again, the power supply switch 16 is first changed from the on to off condition and it is again changed to the on condition.

Figure 10:
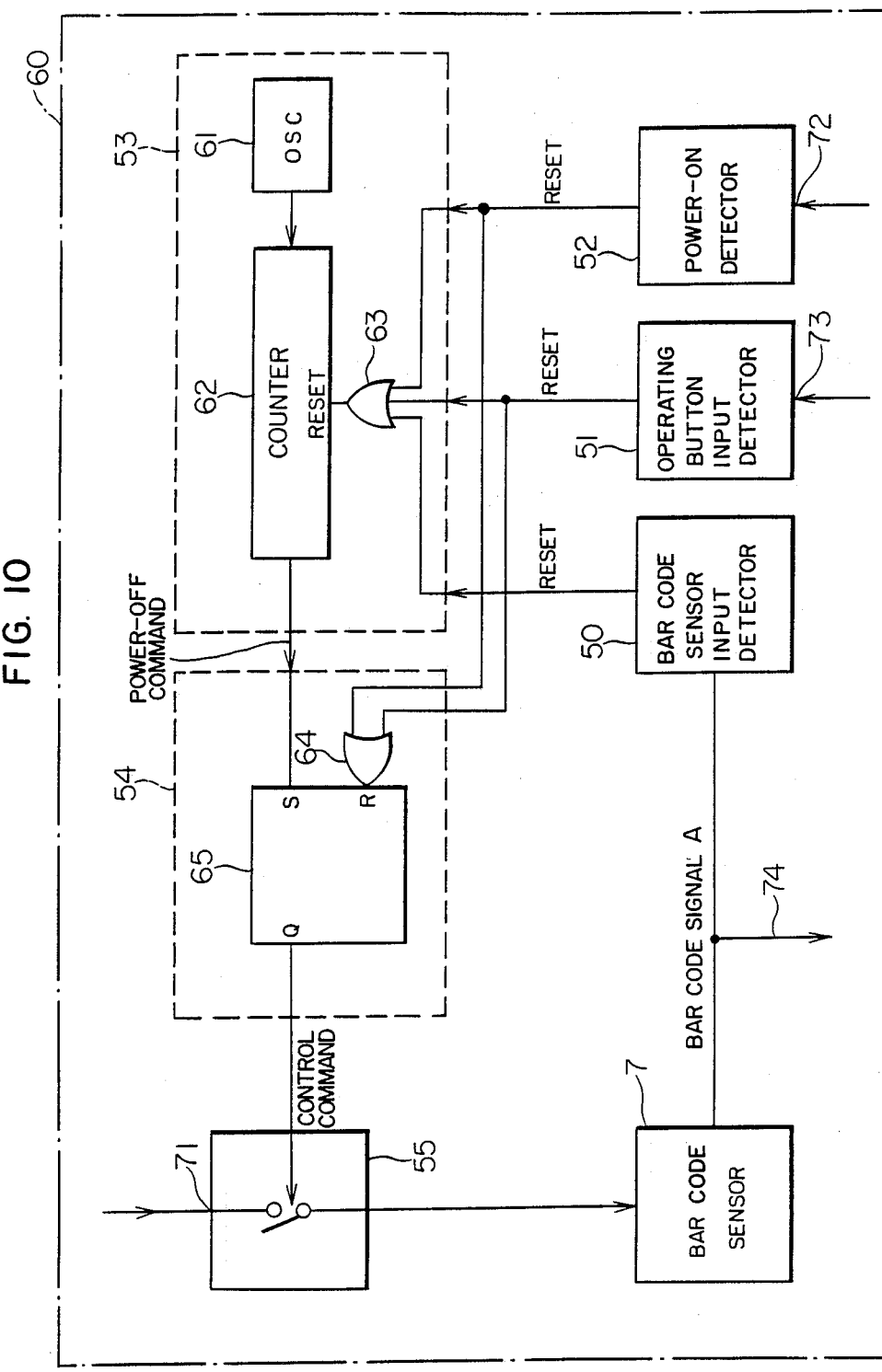
FIG. 10 is a block diagram showing in greater detail the principal part of FIG. 9.

The operation of the present embodiment will now be described in greater detail with reference to FIG. 10. FIG. 10 shows in greater detail the block 60 enclosed by a dotted line in FIG. 9. In FIG. 10, numeral 61 designates an oscillator which generates reference clocks for the clock. Numeral 62 designates a counter for dividing the reference clock frequency. Numerals 63 and 64 designate OR circuits. Numeral 65 designates an R-S flip-flop circuit for latching a control signal. The clock means 53 includes the oscillator 61 and the counter with reset 62. If the bar code signal G has been applied to the bar code senser input detector 50 so that a reset signal is generated from the bar code sensor input detector 50, if the transfer switch 11 has been depressed so that a reset signal is generated from the operating button input detector 51, or if the power supply switch 16 has been changed from the off to on condition so that a reset signal is generated from the power-on detector 52, the R-S flip-flop circuit 65 is reset and the bar code sensor power supply switch means 55 is energized by a control command. Also, in response to the generation of the reset signal the counter 62 is reset and thus there is no danger of the counter 62 immediately generating a power-off command and thereby turning off the bar code sensor power supply switch means 55. Further, the interval between the time that the reset signal is no longer applied to the counter 62 and the time that the counter 62 generates a power-off command is selected sufficiently long (usually about 25 seconds) as compared with the period of reset signals usually generated in a nonspecific manner during the time that the bar coder scanner 18 is used by the user and therefore there is no danger of the bar code sensor power supply switch means 55 being turned off. When the user leaves the bar code scanner 18 as it is with the power supply switch 16 being turned on, no reset signal is applied to the counter 62 so that when a predetermined time (usually about 25 seconds) expires after the leaving of the scanner 18, a power-off command is generated from the counter 62 so that the R-S flip-flop circuit 65 is set and the bar code sensor power supply switch means 55 is turned off. When it is desired to use the bar scanner 18 again in such a condition, it is only necessary to depress the transfer switch 11 or to change the power supply switch 16 from the on to off condition and again from the off to on condition. It is to be noted that signal points 71, 72, 73 and 74 shown in FIG. 9 correspond to signal points 71 to 74 shown in FIG. 10.

Also, from the foregoing it will be seen that when the transfer switch 11 is turned on and the information signal C stored in the program memory section 9 is sent to output means 66 of the transmitting section 12 thus operating a switching transistor 67 by an output from the output means 66 and actuating the transmitting device 13 including an infrared light-emitting diode, that is, during the transmission of the remote control signal, the bar code sensor power supply switch means 55 is controlled in such a manner that the power supply to the bar code sensor 7 is interrupted in response to the detection operation of the operating button input detector 51.

By so doing, it is possible to ensure a longer battery life and stabilize the circuit operation of the various parts over a long period of time in cases where batteries are used as a power source as in the case of the present embodiment.

It is further understood by those skilled in the art that the foregoing description is made as to a preferred embodiment of the disclosed invention and that various changes and modifications may be made according to the invention without departing from the spirit and scope thereof.

What is claimed is:

1. A program recording scheduling apparatus comprising:
    a bar code reading means for photoelectrically reading bar codes from a program member, said bar codes representing different kinds of program information for a particular program event including program date, channel number, start time and end time, said bar code reading means generating program scheduling signals which are a replica of photoelectrically detected bar codes corresponding to said different kinds of program information;
    means for receiving said program scheduling signals from said bar code reading means and converting them into respective storable program signals corresponding to said different kinds of program information for a particular program event, said respective storable program signal omitting preselected information which is contained in corresponding program scheduling signals;
    program memory means containing a plurality of storage areas, said plurality of storage areas respectively storing the storable program signals corresponding to said different kinds of program information for a particular program event in response to signals from a control means;
    transmitting means for converting the storable program signals stored in said memory means into a transmitted infrared remote control signal; and
    data transmitting control means responsive to an applied actuating signal for collectively transmitting said storable program signals corresponding to said different kinds of program information for a particular program event from said program memory means to said transmitting means for conversion into said transmitted infrared control signal.

2. An apparatus according to claim 1, wherein said control means comprises an audible signal generating means for producing a first type of confirming audible sound each time a bar code is read by said bar code reading means for each one of a date, channel number, start time and end time of a particular program event and producing a second type of confirming audible sound when the reading of bar codes for a particular program event, containing data for a date, channel number, start time and end time, is completed.

3. An apparatus according to claim 2, wherein said first type of audible sound is a sound of a first duration and said second type of audible sound is a sound of a second duration longer than the first.

4. An apparatus according to claim 3 wherein said first type of audible sound is a single note sound and said second type of audible sound is a repetitive string of single note sounds.

5. An apparatus according to claim 1, further comprising:
    a power source;
    said control means comprising a resettable clock means, switch means for interrupting a supply of power from said power source to said bar code reading means when said clock means measures a predetermined period of time, and bar code input detecting means for applying a reset signal to said clock means each time said bar code reading means reads a bar code; and
    means for detecting a condition indicating a transmission of said infrared remote control signal from said transmitting means and in response thereto for resetting said clock means.

6. An apparatus according to claim 5, wherein said power source is a battery and wherein said bar code reading means, said means for receiving and converting, said control means, said program memory means, said data transmitting control means, said transmitting means and said battery are contained in a hand-held casing.

7. An apparatus according to claim 1, further comprising:
    a power source; and
    wherein said control means comprises:
    switch means for switching on or off a supply of power from said power source to said bar code reading means in response to the application of a command signal, and
    means for generating said command signal in response to predetermined operative conditions of said apparatus so that said switch means enables said remote control signal to be generated and said bar code reading means to read the bar codes of one program event.

8. An apparatus as in claim 7, wherein said power source is a battery and wherein said bar code reading means, said means for receiving and converting, said control means, said program memory means, said data transmitting control means, said transmitting means and said battery are contained in a hand-held casing.

9. An apparatus according to claim 7 wherein said means for generating said command signal does so in response to any one of: (a) operation of a power supply switch and (b) transmission of said infrared remote control signal by said transmitting means.

10. An apparatus according to claim 9 wherein said generating means removes said command signal a predetermined period of time after it is generated unless one of: (a) operation of said power supply switch; (b) transmission of said infrared remote control signal by said transmitting means and (c) the reading of bar codes by said bar code reader occurs during said predetermined period of time.

11. An apparatus according to claim 1, further comprising:
    a video tape recorder adapted for timer program recording, said video tape recorder including a timer apparatus for controlling program recording, means for receiving said transmitted infrared remote control signal and for operating said timer apparatus with data contained in said transmitted infrared remote control signal; and
    a display means responsive to the output signals of said remote control signal receiving means to visually display program information data including one or more of a programmed date, channel number, start time and end time, contained in received infrared remote control signals, for a predetermined time.

* * * * *